July 2, 1963   C. GRANET ETAL   3,096,066
VEHICLE-SEAT SUSPENSION
Filed Jan. 6, 1961
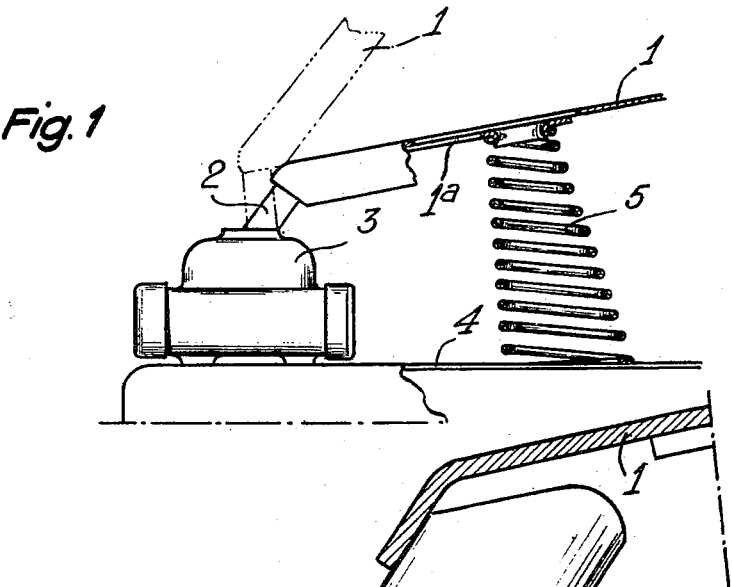
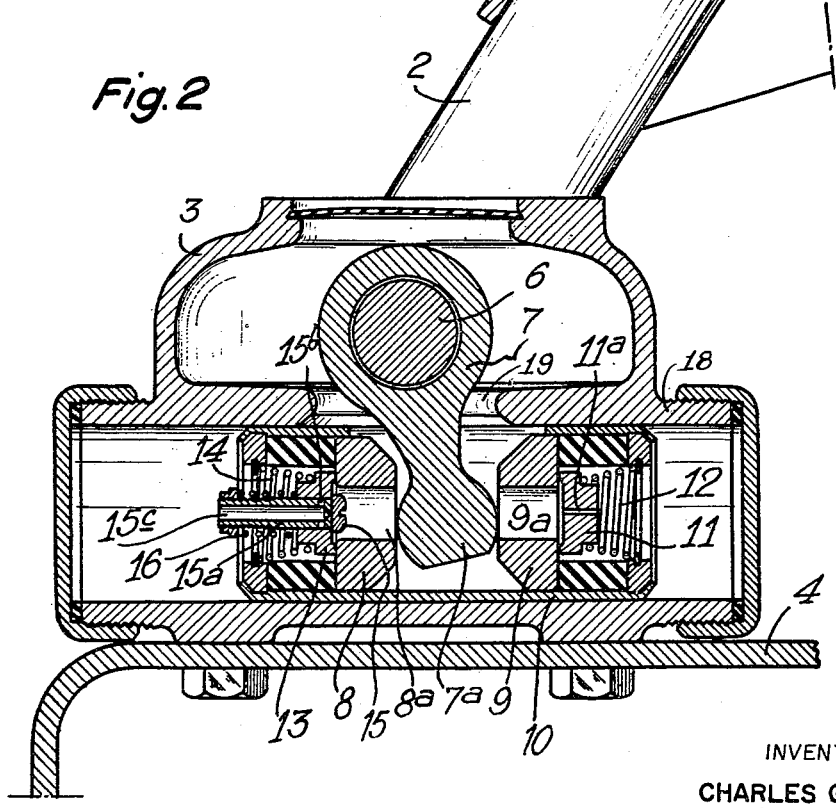
INVENTORS.
CHARLES GRANET
ROBERT CRAUC
AGENT.

3,096,066
VEHICLE-SEAT SUSPENSION
Charles Granet, 32 Blvd. de Lorraine, Courbevoie, France, and Robert Crauc, 2 Ave. Louis Dardenne, Vanves, France
Filed Jan. 6, 1961, Ser. No. 81,136
Claims priority, application France Nov. 30, 1960
6 Claims. (Cl. 248—399)

This invention relates to suspension systems of vehicle seats, notably for vehicles operated under jolting conditions, such as road or farming tractors, harvesters, reapers and other agricultural machines, and in general any vehicles for public or farming works which subject their drivers and passengers to relatively strong vibration, jolting or shaking.

With the suspension system of this invention it is possible not only to provide a satisfactory comfort to the seated person but also to raise the seat and to hold same in this raised position.

This system is particularly useful in the case of vehicles without a body, with a view to preventing rainwater from stagnating on the seat.

This suspension system comprises a seat support resiliently connected to a suitable portion of the vehicle structure, the support being pivoted on said vehicle portion through the medium of a double-acting hydraulic shock absorber having two channeled piston heads with a pair of differently calibrated, oppositely acting valves so as to produce different braking actions according to the direction in which the shock-absorbed arm is moved by an external force.

Other specific features and advantages of this invention will become apparent as the following description proceeds with reference to the accompanying drawing illustrating diagrammatically by way of example a typical embodiment of the invention, it being understood that changes in the precise embodiment of the invention herein disclosed may be made within the scope of what is claimed without departing from the spirit of the invention.

In the drawing:

FIG. 1 is a diagrammatical view showing a seat suspension according to this invention (the chain-dotted lines showing the seat in its raised position); and FIG. 2 is an axial section showing on a larger scale the shock absorber utilized for the purposes specified.

As shown in FIG. 1, the suspension comprises a support 1 for a seat (not shown) which is rigid with the arm 2 of a shock absorber 3 secured on a base portion 4 of the vehicle structure (or on an intermediate plate secured in turn on this portion), and a resilient member, shown by way of example as a helical compression spring 5, disposed between the support 1 and base portion 4. Preferably, this spring 5 is adjustable by having one end anchored on a slide 1a adapted to be set in different longitudinal positions, this slide being adjustable with respect to the support 1.

The shock absorbed shown in FIG. 2 comprises in the conventional manner a body 3, a shaft 6 being journaled across said body and rotatably solid on the one hand with an external arm 2 and on the other hand with the inner crank arm 7 engaging with its projecting end 7a the heads 8 and 9 of a two-headed piston 10, respectively. The body 3 is integral with a cylinder 18 filled with hydraulic fluid, for example oil of the type usually employed in shock absorbers, this cylinder has an upper central aperture 19 for the passage of the lever arm 7.

The shock absorber illustrated in FIG. 2 comprises flow-control devices having different characteristics according to the type of piston head considered.

Thus, it will be noted that the valve on the right-hand piston head 9 consists of a member 11 urged by a spring 12 against the seat formed by the head 9 so as to close the central passage or channel 9a of relatively large cross-sectional area. A leakage path is created by an orifice 11a of relatively small diameter in valve member 11. The valve assembly on the left-hand piston head 8 comprises a member 13 pressed by a spring 14 against the seat formed by the head 8 in order to close the central passage or channel 8a of relatively large cross-sectional area, but this member 13 is formed with a central bore slidably penetrated by the stem 15a of a valve having its head 15 adapted to close this bore under the influence of a spring 16. The valve stem 15a is formed with a blind axial hole 15c communicating with a radial orifice or port 15b, the latter being normally blocked by the surrounding valve member 13.

It is clear that the orifice 11a will retard the flow of hydraulic fluid in the manner of a dashpot whenever the crank arm 7 and therefore the seat support 1 are oscillated.

When the seat is raised manually to the position shown in chain-dotted lines in FIG. 1, it would return to the normal or operative position (full lines) if the valve 13 were designated like the valve 11 since in this case the fluid would flow through a permanently open leakage passage such as orifice 11a. By virtue of the substitution of a valve member 13, in the head 8, for this valve 11, the oil cannot flow through this member in the direction from left to right corresponding to a lowering of the seat support 1, unless the force tending to lower the arm 2 is capable of unseating the valve 15. As the weight of the seat is not sufficient to obtain this effect, the raised seat cannot lower itself unless it is forced to do so by a load or an impact of such magnitude that the counteracting pressure of cushioning spring 5 is overbalanced to a degree which will develop across the head 8 a pressure differential large enough to open the valve 15. Evidently, the seat-lowering force capable of having this effect will have to be considerably greater than a seat-raising force adapted to the valve 13, in view of the difference between the effective surface areas of the two valves 13, 15. It should be observed, furthermore, that whereas valve 13 upon opening will let the fluid flow relatively freely through passage 8a, a yielding of valve 15 will permit only a restricted flow since the fluid must always pass through the narrow port 15b.

Of course, many modifications and variations may be brought to the embodiment shown and described herein without departing from the spirit and scope of the invention as set forth in the appended claims.

What we claim is:

1. A seating assembly for a vehicle subject to jolting, comprising a base; a seat support mounted on said base for pivotal movement about a horizontal axis; resilient means anchored to said base and to said seat support for counteracting the weight of the latter; hydraulic damping means on said base, said damping means including a piston cylinder and piston means axially slidable in said cylinder; and transmission means positively connecting said seat support with said piston means; said piston means comprising a pair of axially spaced heads forming channels for the passage of a hydraulic fluid in generally axial direction within said cylinder, a first valve on one of said heads spring-urged into a normal position blocking the passage of said fluid in one axial direction while being yieldable to a predetermined fluid pressure in the opposite axial direction, said one of said heads being provided with an orifice of a width unaffected by the position of the said first valve and independent of the pressure differential across said orifice for enabling the passage of a restricted fluid flow therethrough, a second valve on the other of said heads spring-urged into a normal position blocking the passage of said fluid in said opposite axial direction while being yieldable to a predetermined fluid pressure in said one direction, and a third valve on said other of said heads spring-urged into a normal position blocking the passage of said fluid in said one direction while being yieldable to a predetermined fluid pressure in said opposite direction, said third valve being provided with a port obstructed in its normal position and exposed upon yielding for permitting only a restricted flow of said fluid through said other of said heads in said opposite direction.

2. A seating assembly for a vehicle subject to jolting, comprising a base; a seat support mounted on said base for pivotal movement about a horizontal axis; resilient means anchored to said base and to said seat support for counteracting the weight of the latter; hydraulic damping means on said base, said damping means including a piston cylinder and a piston axially slidable in said cylinder; and transmission means positively connecting said seat support with said piston means; said piston being provided with a pair of axially aligned heads forming channels for the passage of a hydraulic fluid in generally axial direction within said cylinder, a first valve on one of said heads spring-urged into a normal position blocking the passage of said fluid in one axial direction while being yieldable to a predetermined fluid pressure in the opposite axial direction responsive to a relatively small seat-lowering force, said one of said heads being provided with an orifice of a width unaffected by the position of said first valve and independent of the pressure differential across said orifice for enabling the passage of a restricted fluid flow therethrough, a second valve on the other of said heads spring-urged into a normal position blocking the passage of said fluid in said opposite axial direction while being yieldable to a predetermined fluid pressure in said one direction responsive to a relatively small seat-raising force, and a third valve on said other of said heads spring-urged into a normal position blocking the passage of said fluid in said one direction while being yieldable to a predetermined fluid pressure in said opposite direction responsive to a relatively large seat-lowering force, said third valve being provided with a port obstructed in its normal position and exposed upon yielding for permitting only a restricted flow of said fluid through said other of said heads in said opposite direction.

3. A seating assembly for a vehicle subject to jolting, comprising a base; a seat support mounted on said base for pivotal movement about a horizontal axis; resilient means anchored to said base and to said seat support for counteracting the weight of the latter; hydraulic damping means on said base, said damping means including a piston cylinder and piston means axially slidable in said cylinder; and transmission means positively connecting said seat support with said piston means; said piston means comprising a pair of axially spaced heads each formed with a respective channel for the passage of a hydraulic fluid in generally axial direction within said cylinder, a first valve on one of said heads spring-urged into a normal position blocking the passage of said fluid in one axial direction through said channel thereof while being yieldable to a predetermined fluid pressure in the opposite axial direction, said first valve being provided with an orifice of a width unaffected by the position of said first valve and independent of the pressure differential across said orifice for enabling the passage of a restricted fluid flow therethrough, a second valve on the other of said heads spring-urged into a normal position blocking the passage of said fluid in said opposite axial direction through said channel thereof while being yieldable to a predetermined fluid pressure in said one direction, said second valve being formed with a substantially axially extending throughgoing bore, and a third valve on said second valve spring-urged into a normal position blocking the passage of said fluid in said one direction through said bore while being yieldable to a predetermined fluid pressure in said opposite direction, said third valve being provided with a port obstructed in its normal position and exposed upon yielding for permitting only a restricted flow of said fluid through said bore in said opposite direction.

4. A seating assembly for a vehicle subject to jolting, comprising a base; a seat support mounted on said base for pivotal movement about a horizontal axis; resilient means anchored to said base and to said seat support for counteracting the weight of the latter; hydraulic damping means on said base, said damping means including a piston clinder and a piston axially slidable in said cylinder; and transmission means positively connecting said seat support with said piston means; said piston being provided with a pair of axially aligned heads each formed with a respective channel for the passage of a hydraulic fluid in generally axial direction within said cylinder, a first valve on one of said heads spring-urged into a normal position blocking the passage of said fluid in one axial direction through said channel thereof while being yieldable to a predetermined fluid pressure in the opposite axial direction responsive to a relatively small seat-lowering force, said first valve being provided with an orifice of a width unaffected by the position of said first valve and independent of the pressure differential across said orifice for enabling the passage of a restricted fluid flow therethrough, a second valve on the other of said heads spring-urged into a normal position blocking the passage of said fluid in said opposite axial direction through said channel thereof while being yieldable to a predetermned fluid pressure in said one direction responsve to a relative small seat-raising force, said second valve being formed with a substantially axially extending throughgoing bore, and a third valve on said second valve spring-urged into a normal position blocking the passage of said fluid in said one direction through said bore whle being yieldable to a predetermned fluid pressure in said opposite direction responsive to a relatively large seat-lowering force, said third valve being provided with a port obstructed in its normal position and exposed upon yielding for permitting only a restricted flow of said fluid through said bore in said opposite direction.

5. A seating assembly for a vehicle subject to jolting comprising a base; a seat support mounted on said base for pivotal movement about a horizontal axis; resilient means anchored to said base and to said seat support for counteracting the weight of the latter; hydraulic damping means on said base, said damping means including a piston cylinder and piston means axially slidable in said cylinder; and transmission means opsitively connecting said seat support with said piston means; said piston means comprising a pair of axially spaced heads each formed with a respective channel for the passage of a hydraulic fluid in generally axial direction within said cylinder, a first valve on one of said heads spring-urged into a normal position blocking the passage of said fluid in one axial direction through said channel thereof while being yieldable to a predetermined fluid pressure in the opposite axial direction, said first valve being provided with an orifice of a width unaffected by the position of said first valve and independent of the pressure differential across said orifice for enabling the passage of a restricted fluid flow therethrough, a second valve on the other of said heads spring-urged into a normal position blocking the passage of said fluid in said opposite axial direction through said channel thereof while being yieldable to a predetermined fluid pressure in siad one direction, said second valve being formed with a substantially axially extending throughgoing bore, and a third valve on said second valve spring-urged into a normal position blocking the passage of said fluid in said one direction through said bore while being yieldable to a predetermined fluid pressure in said opposite direction, said third valve being provided with a stem slidably received in said bore and formed with *a* substantially axial hole terminating in a laterally extending port obstructued in the normal position of said stem, said port being exposed upon a yielding of said third valve for permitting only a restricted flow through said bore in said opposite direction.

6. A seating assembly according to claim 5 wherein said cylinder is substantially horizontal and provided with an upper aperture at an intermediate axial location, said transmission means including a lever arm extending into said cylinder through said aperture and engaging said piston between said heads.

References Cited in the file of this patent

UNITED STATES PATENTS

| | | |
|---|---|---|
| 2,470,907 | White et al. | May 24, 1949 |
| 2,587,121 | Deardorff et al. | Feb. 26, 1952 |
| 2,788,842 | Ohlenkamp | Apr. 16, 1957 |
| 2,821,239 | Brendel | Jan. 28, 1958 |

FOREIGN PATENTS

| | | |
|---|---|---|
| 1,033,124 | France | Apr. 1, 1953 |